United States Patent [19]
Presby

[11] Patent Number: 5,467,415
[45] Date of Patent: Nov. 14, 1995

[54] METHOD FOR MAKING POLARIZATION INDEPENDENT SILICA OPTICAL CIRCUITS

[75] Inventor: Herman M. Presby, Highland Park, N.J.

[73] Assignee: AT&T Corp., Murray Hill, N.J.

[21] Appl. No.: 231,529

[22] Filed: Apr. 22, 1994

[51] Int. Cl.⁶ ........................................ G02B 6/12
[52] U.S. Cl. ................................ 385/14; 385/129
[58] Field of Search ...................... 385/14, 129, 130, 385/131

[56] References Cited

U.S. PATENT DOCUMENTS

| | | | |
|---|---|---|---|
| 4,178,197 | 12/1979 | Marinace | 385/129 |
| 4,781,424 | 11/1988 | Kawachi et al. | 385/1 |
| 4,889,401 | 12/1989 | Klement et al. | 385/131 |
| 5,313,535 | 5/1994 | Williams | 385/14 |

Primary Examiner—Rodney B. Bovernick
Assistant Examiner—Robert E. Wise
Attorney, Agent, or Firm—Glen E. Books

[57] ABSTRACT

In accordance with the invention, a polarization independent optical device is fabricated by building the waveguide structure on a silicon substrate, adding a reinforcing layer of glass and removing regions of the silicon substrate underlying the waveguide structure. Alternatively, a reinforcing layer of glass can be added after the silicon in removed. Removal of the silicon underlying the waveguide structure eliminates polarization dependent spectral effects by eliminating the source of compressive strain, and the resulting glass reinforced structures are sufficiently robust for practical applications.

13 Claims, 2 Drawing Sheets

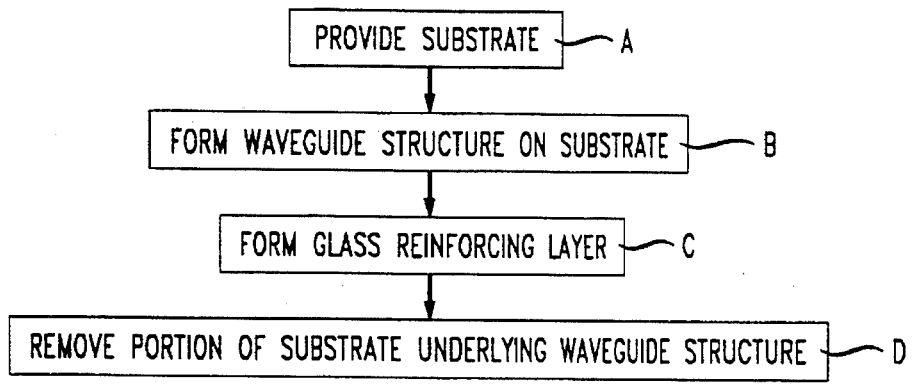
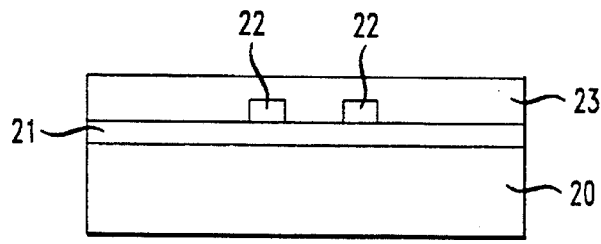
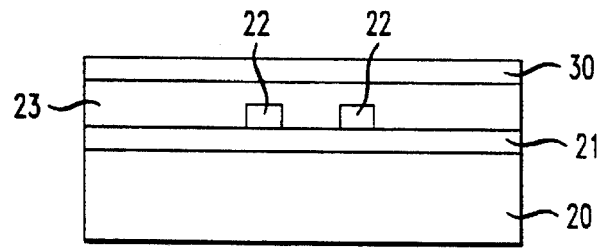
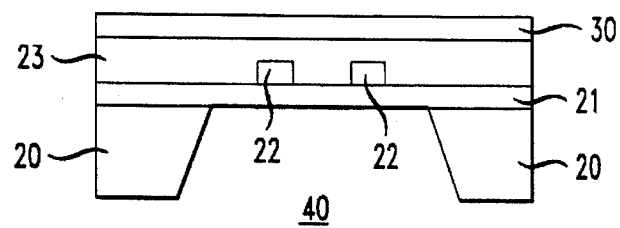

METHOD FOR MAKING POLARIZATION INDEPENDENT SILICA OPTICAL CIRCUITS

FIELD OF THE INVENTION

This invention relates to polarization independents silica optical circuits. The invention is particularly useful for providing multiplexers and demultiplexers with a polarization independent special response.

BACKGROUND OF THE INVENTION

As optical fiber communications channels increasingly replace metal cable and microwave transmission links, integrated optical devices for directly processing optical signals become increasingly important. A useful approach to optical processing is through the use of integrated glass waveguide structures formed on silicon substrates. The basic structure of such devices, commonly called silica optical circuits, is described in C. H. Henry et al., "Glass Waveguides on Silicon for Hybrid Optical Packaging", 7 *J. Lightwave Technol.*, pp. 1530–1539 (1989) which is incorporated herein by reference. In essence a silicon substrate is provided with a base layer of $SiO_2$, and a thin core layer of doped silica glass is deposited on the oxide. The core layer can be configured to a desired waveguide structure-typically 5–7 micrometers wide-using standard photolithographic techniques, and a layer of doped silica glass is deposited on the core to act as a top cladding. Depending on the precise configuration of the waveguide, such devices can perform a wide variety of functions such as beam splitting, tapping, multiplexing, demultiplexing and filtering.

One shortcoming of such devices, however, is birefringence induced in the waveguide core by compressive strain. The compressive strain is due to differential thermal expansion between the silicon and the silica. The effect of the resulting birefringence is that different polarization modes of transmitted light are presented with different effective indices of refraction. Specifically, the transverse magnetic mode (TM) encounters a greater index than does the transverse electric (TE) mode. The dispersive effect is further aggravated by curves in the waveguide. When traversing a curve, optical modes are shifted radially outward. A mode loosely bound to the waveguide core (TM) will experience a greater outward shift than a mode more tightly bound (TE) with the consequence that the loosely bound mode has a greater optical path length and phase.

Elimination of the resulting birefringence has long been recognized as necessary for high performance optical devices. Indeed a variety of elaborate schemes have been proposed for compensating such birefringence. One method employs a half-wave plate inserted in the middle of a waveguide grating multiplexer to rotate the polarization by 90°. See H. Takahashi et al., "Polarization-Insensitive Arrayed-Waveguide Multiplexer on Silicon", *Opt. Letts.*, 17 (7), p. 499 (1992). This approach leads to excessive loss. Another approach is to deposit on the waveguide a thick layer (six micrometers) of amorphous silicon. But the silicon layer must then be actively trimmed with a high power laser. See M. Kawatchi, et al, "Laser Trimming Adjustment of Waveguide Birefringence In Silica Integrated Optic Ring Resonators", Proc. CLEO '89, Tu J. 17 (April 1989). Yet a third approach is to etch grooves alongside the waveguide to release strain. This approach requires deep grooves on the order of 60 micrometers deep. See M. Kawatchi et al, "Birefringence Control in High-Silica Single-Mode Channel Waveguides in Silicon", Proc. OFC/IOOC '87, Tu Q 31 (Jan. 1987). Accordingly, strain-induced birefringence is clearly a problem in silicon based integrated optical devices.

SUMMARY OF THE INVENTION

In accordance with the invention, a polarization independent optical device is fabricated by building the waveguide structure on a silicon substrate, adding a reinforcing layer of glass and removing regions of the silicon substrate underlying the waveguide structure. Alternatively, a reinforcing layer of glass can be added after the silicon in removed. Removal of the silicon underlying the waveguide structure eliminates polarization dependent spectral effects by eliminating the source of compressive strain, and the resulting glass reinforced structures are sufficiently robust for practical applications.

BRIEF DESCRIPTION OF THE DRAWINGS

The advantages, nature and various additional features of the invention will appear more fully upon consideration of the illustrative embodiments now to be described in detail in connection with the accompanying drawings. In the drawings:

FIG. 1 is a schematic block diagram showing the steps for making a polarization independent integrated optical device in accordance with a first embodiment of the invention;

FIGS. 2–4 are schematic cross sections of the device at various stages in the process of FIG. 1.

Figure 5:
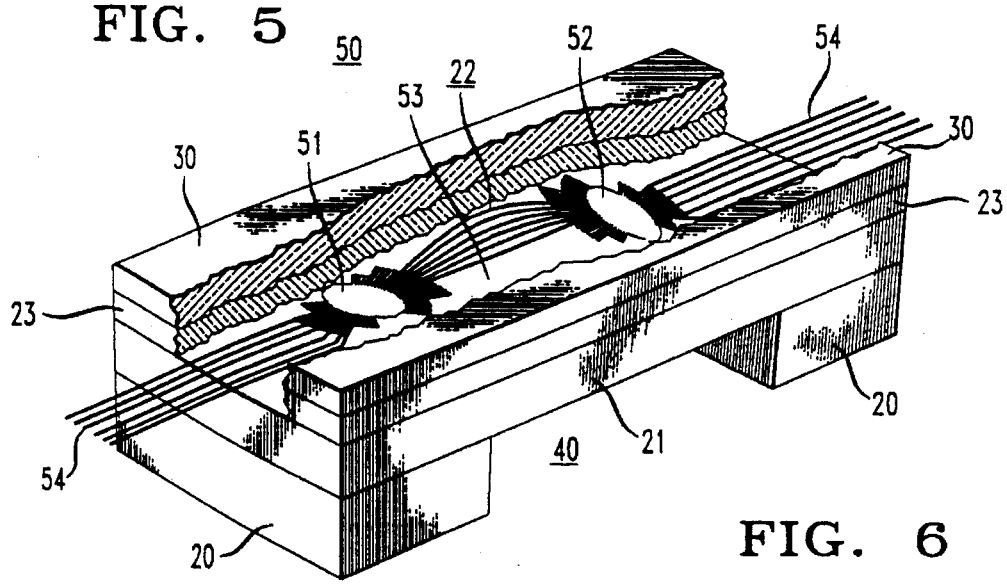
FIG. 5 is a perspective view of a preferred device made in accordance with the process of FIG. 1.

It is to be understood that these drawings are for purposes of illustrating the concepts of the invention and are not to scale.

DETAILED DESCRIPTION

Referring to the drawings, FIG. 1 is a block diagram illustrating a first embodiment of a method for making a polarization independent integrated optical device. The first step, shown in block A, is to provide a substrate upon which the waveguide structure can be conveniently formed. The substrate advantageously comprises a material which can be selectively removed by etchants which do not also etch the glass waveguide structure to be formed on the substrate. Preferably, the substrate is a wafer of (100) silicon having a thickness of about ½ millimeter silicon.

The next step, shown in block B, involves forming a waveguide structure on the substrate. Advantageously, the waveguide structure can be formed in the conventional manner by 1) forming a layer of undercladding glass on the substrate, 2) applying a layer of core glass and photolithographically defining a desired pattern of waveguides and 3) applying a layer of glass overcladding over the defined waveguides. Conveniently, the first layer of cladding glass can be provided by growing $SiO_2$ on the silicon substrate by high pressure steam oxidation. The core layer can be deposited on the oxide using LPCVD and can be dry etched as by RIE to pattern the waveguide configuration. Typical waveguide core widths are in the range 5–7 micrometers. The core glass is preferably silica doped with 6–8% phosphorus and advantageously has a thickness in the range 4–6 micrometers. The core glass is advantageously annealed, and thereafter a preferred overcladding layer of phosphorus and boron doped silica can be deposited in a thickness in the range of 7–15 micrometers.

FIG. 2 shows the resulting; structure of substrate 20, undercladding 21, waveguides 22, and overcladding 23. Configurations of waveguides useful as optical switches, multiplexers, demultiplexes, planar lenses, and low order array multiplexers are shown in U.S. Pat. No. 5,136,671 issued to C. Dragone and U.S. Pat. No. 5,212,758 issued to R. Adar et al, both of which are incorporated herein by reference.

As shown in block C of FIG. 1, the third step is to form a glass reinforcing layer over the exposed surface of the clad waveguide. This can be done by applying an additional glass layer as by flame hydrolysis or by increasing the thickness of the overcladding. In either event, an additional thickness of glass preferably in excess of 20 micrometers is added for protecting the waveguide structure. The resulting structure is shown in FIG. 3 where the reinforcing layer 30 is disposed on the overcladding 23.

The next step in block D of FIG. 1 is removing at least the portion of the substrate underlying the waveguide structure. This removal can be done mechanically, as by milling or laser ablation, chemically, as by wet etching or reactive ion etching, or by a combination of the two. Where the substrate is silicon, a pocket underlying the waveguide region is preferably milled out using a standard milling machine with a diamond tool. The substrate is milled to remove at least half its thickness and preferably at least 90% of its thickness. The remaining thickness of silicon can be etched away, as by using KOH etchant which, at 90° C., etches silicon at a rate of about 3 μm/hr.

The resulting product is schematically illustrated in the cross section of FIG. 4 showing pocket 40 where the substrate has been removed in the region below waveguides 22. This structure has the advantage of no contact between the glass and substrate in the region near the waveguides, reducing and substantially eliminating birefringence due to compressive stress.

FIG. 5 is a perspective view of a preferred device 50 made in accordance with the process of FIG. 1 useful as an optical multiplexer, demultiplexer or switching device. In essence, the device comprises a waveguide configuration 22 of the type shown in U.S. Pat. No. 5,136,671 wherein portion 40 of substrate 20 has been removed below the waveguide configuration 22. More specifically, waveguide configuration 22 comprises a pair of substantially identical star couplers 51 and 52 connected by an optical diffraction grating 53 comprising M unequal length waveguides spaced from one another by predetermined amounts. The device is shown interconnected with N optical fibers 54 on either end. As is well known, each star coupler comprises a dielectric slab defining a free space region between periodic arrays of waveguides, each radially directed toward a virtual focal point. The device forms an NXN integrated optical interconnection apparatus capable of switching, multiplexing or demultiplexing a large number of input and output wavelength channels with low crosstalk and insertion loss.

The preferred technique for coupling optical fibers to a waveguide device and packaging the product are described in applicant's U.S. Pat. No. 5,076,654 issued Dec. 31, 1991 and entitled "Packaging of Silicon Optical Components". This patent is incorporated herein by reference.

Figure 6:
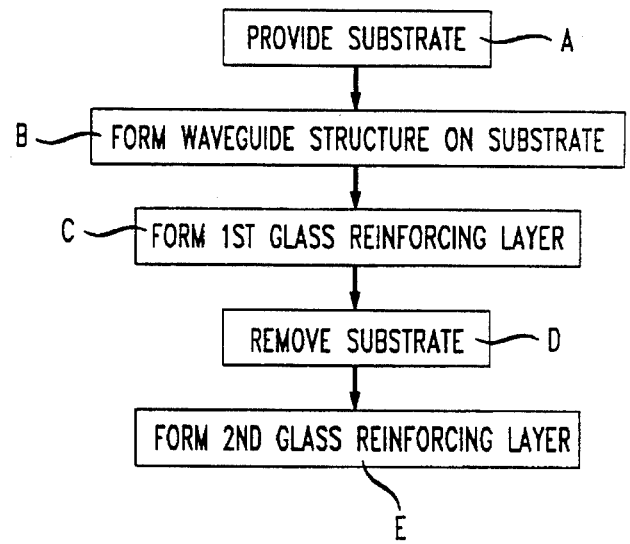
FIG. 6 is a schematic block diagram showing the steps in an alternative method for making an integrated optical device.
Figure 7:
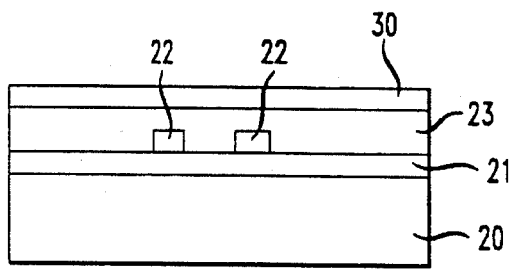
FIGS. 7–9 are schematic cross sections of the device at various stages in the process of FIG. 6.
Figure 8:
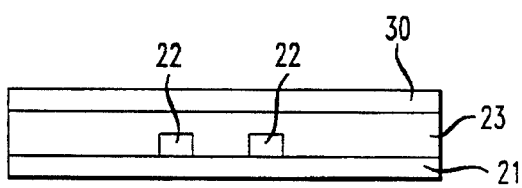
Figure 9:
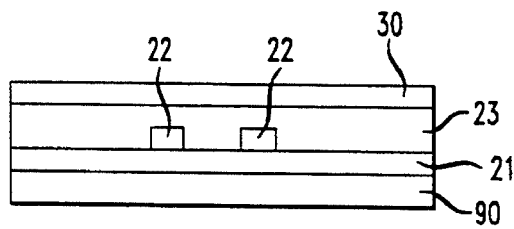

FIG. 6 shows an alternative embodiment similar to the process of FIG. 1 in the first three steps depicted in blocks A, B, C of FIG. 6, but differing in the fourth step at block D where the entire substrate is removed. As shown in block D, a second reinforcing layer of glass (>20 μm) is then applied on the side from which the substrate was removed. FIG. 7 shows the structure before removal of the substrate. FIG. 8 shows it after removal, and FIG. 9 shows the resulting product with the second reinforcing layer 90 of glass in place.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

I claim:

1. A method for making an integrated optical device comprising the steps of:

providing a substrate;

forming an optical waveguide structure on a region of the substrate;

forming a reinforcing layer over said waveguide structure; and removing said region of the substrate underlying said waveguide structure.

2. The method of claim 1 wherein said reinforcing layer comprises glass.

3. The method of claim 1 wherein said optical waveguide structure is formed by the steps of forming a layer of undercladding glass on said substrate, applying a layer of core glass on said undercladding glass, defining a pattern of waveguides in said layer of core glass, and applying a layer of overcladding glass on said pattern of waveguides.

4. The method of claim 1 wherein at least a portion of the thickness of said region of the substrate is removed mechanically.

5. The method of claim 1 wherein at least a portion of the thickness of said region of the substrate is removed chemically.

6. The method of claim 1 wherein said region of the substrate is removed by mechanically removing at least one-half the thickness in said region and chemically removing the remaining thickness.

7. The method of claim 1 wherein said glass reinforcing layer has a thickness of at least 20 micrometers.

8. The method of claim 1 wherein said substrate comprises silicon.

9. A product made by the process of claim 1 or 2 or 3 or 4 or 5 or 6 or 7 or 8.

10. A method for making an integrated optical device comprising the steps of:

providing a substrate;

forming an optical waveguide structure on said substrate;

forming a first reinforcing layer over said waveguide structure;

removing said substrate; and forming a second reinforcing layer overlying the surface from which the substrate was removed.

11. The method of claim 10 wherein said first reinforcing layer is glass.

12. The method of claim 10 wherein said second reinforcing layer is glass.

13. A product made by the process of claim 10 or 11 or 12.

\* \* \* \* \*